Figure 1:
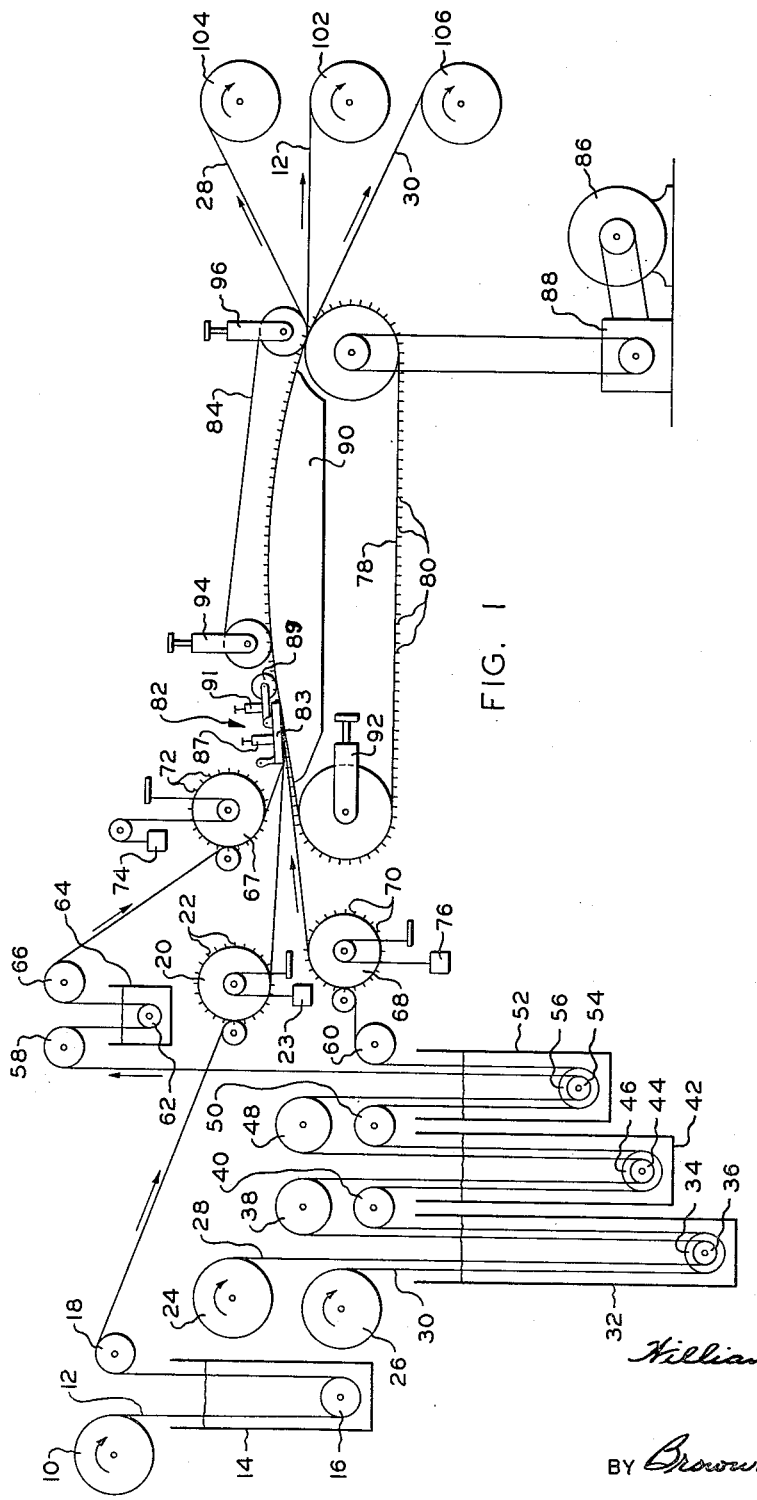

June 6, 1961 W. H. RYAN 2,986,996
APPARATUS FOR AND METHOD OF IMBIBITION PRINTING
Filed Oct. 22, 1954

INVENTOR
William H. Ryan

BY Broward Mikulka
ATTORNEYS

United States Patent Office 2,986,996
Patented June 6, 1961

2,986,996
APPARATUS FOR AND METHOD OF IMBIBITION PRINTING
William H. Ryan, Billerica, Mass., assignor to Polaroid Corporation, Cambridge, Mass., a corporation of Delaware
Filed Oct. 22, 1954, Ser. No. 463,876
4 Claims. (Cl. 101—149.1)

The present invention relates generally to the reproduction of photographic images and, as illustrated herein, relates more particularly to methods of and apparatus for continuously and simultaneously forming reproductions of photographic images on both surfaces of a transparent film.

One object of the present invention is to provide a novel method whereby superimposed successive images may be simultaneously and continuously reproduced on opposite surfaces of a transparent hydrophilic plastic film.

A further object of the invention is to provide a method which is particularly adapted to the continuous and simultaneous production of dichroic prints which may be combined as superimposed right- and left-eye stereoscopic images.

A still further object is to provide apparatus by the use of which predetermined successive images may be successively and continuously reproduced on opposite surfaces of a transparent hydrophilic plastic film in such a manner that the predetermined successive images are superimposed. To this end, and as illustrated, the apparatus is provided with means for conditioning an image-receiving strip, means for continuously saturating predetermined washoff reliefs on separate films with a solution containing a dichroic dye, and means for pressing each of said films into contact with opposite faces of the conditioned film strip where the dichroic dye of each relief film is continuously transferred to the face of the plastic film strip with which it is in contact.

Other objects of the invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a schematic representation of a machine illustrating one embodiment of the present invention.

In the preferred embodiment of the invention, the prints which are the products thereof are produced on a continuous strip of transparent plastic material, particularly a plastic from the class consisting of the hydrophilic linear high polymers such, for example, as polyvinyl alcohol, polyvinyl acetal, and regenerated cellulose. Of the materials falling within this class, the preferred material is polyvinyl alcohol and prints or images formed in properly prepared sheets or film strips of that material possess the highest dichroism and hence are most suitable in the production of superimposed right- and left-eye stereoscopic images. This material is also satisfactory for use in the production of full color prints or images.

The image-receiving strip for use in forming stereoscopic or three-dimensional motion picture film preferably comprises a support having the usual sprocket-tooth-receiving perforations adjacent to each edge thereof. Secured to one surface of the support is a strip of polyvinyl alcohol having its molecules oriented in a direction at an angle of substantially 45° to the edge of the support, and secured to the other surface of the support is a similar strip of polyvinyl alcohol, but having its molecules oriented in a direction at right angles to the molecules of the polyvinyl alcohol strip secured to the other surface.

In accordance with the present invention, it is proposed to form reproductions of predetermined successive images, such as photographs, by a continuous transfer process from a conventional photographic colloid relief such as a washoff gelatin relief. Such washoff reliefs are formed in any suitable manner, such, for example, as by exposing a relief strip to the action of light transmitted through a negative having predetermined successive photographic images thereon. The strip, after adequate exposure, is developed, washed, bleached, fixed and dried. A suitable method for forming washoff reliefs is disclosed in U.S. Letters Patent No. 2,315,373, granted March 30, 1943, on an application filed in the name of Edwin H. Land.

The relief is now ready for that step in the process wherein the image is transferred to a hydrophilic plastic film strip such as polyvinyl alcohol. This is accomplished by imbibing or saturating the relief in a conventional manner in a solution containing one or more dyes of the desired color, and then imbibing or saturating another relief in a solution containing either a dye of the same color as before, or a different color, depending upon the type of print which it is desired to make. The two reliefs are then placed in pressure contact with opposite surfaces of a transparent hydrophilic plastic film with the predetermined relief images in superimposed position.

It is intended that the present invention shall be used not only for the production of a stereoscopic motion picture film wherein the right- and left-eye images of successive stereoscopic pairs are superimposed, but also for simultaneously applying superimposed color images to a conventional motion picture film.

The term "dichroism" is used herein and in the claims as meaning the property of differential absorption of the components of an incident beam of light depending upon the vibration directions of the components. By "dichroic dye or stain" is meant a dye or stain whose molecules possess the property of showing dichroism. In the practice of the present invention, this dichroic property is displayed when the dyes are incorporated in molecularly oriented plastic materials in that the resulting stained areas show dichroism. Some of the dyes and stains which are used in the process display dichroism which may extend throughout substantially the entire visible spectrum, whereas others possess considerably shorter absorption bands and hence show dichroism throughout a band of wavelengths somewhat shorter than the visible spectrum.

The dichloric dyes or stains which may be used in the practice of the present invention fall into two general groups. The first group comprises solutions which will produce a stain comprising iodine on an oriented plastic such as polyvinyl alcohol. Generally speaking, such solutions may be formed by dissolving the desired proportions of iodine and at least one soluble iodide salt in water. The proportions and concentrations thereof may vary substatnially as described in the above mentioned Letters Patent.

The other group of dyes suitable for use for this step of the invention comprises water-soluble dichroic dyes such, for example, as direct cotton dyes of the azo type, or dichroic dyes prepared from fast color salts. Such dyes should be selected for their ability to show high dichronism when applied to a properly oriented sheet of a plastic such as polyvinyl alcohol, and preferred examples thereof are listed below and will be found with few exceptions in the disazo, trisazo, stilbene, thiazole and pyrazolone groups. This type may be used alone in the production of monochromatic prints, or in any desired combination to produce any desired color films as will be pointed out in more detail hereinafter.

Dichroic dyes suitable for use in the practice of the present invention include the following:

Amanil Bordeaux 6B (Prototype 19)
Amanil Fast Orange EG (Pr. 72)
Azidin Fast Yellow 3GU
Azoanthrene Brilliant Rubine B Ex
Belamine Fast Red 8BL (Color Index No. 278)
Bixamine Fast Red 8BL (C.I. 278)
Blue Salt B Phenol
Blue Salt B Resorcinol
Calcodur Yellow NN Conc. (C.I. 814)
Calcomine Yellow AF (C.I. 622)
Carbide Fast Yellow G
Chlorantine Fast Red 5B
Chlorantine Fast Yellow 5GLL
Coating Yellow CP
Diphenyl Fast Red 5BL Supra I (C.I. 278)
Dipyrazo Bordeaux BL
Direct Fast Garnet WSB
Erie Yellow F (C.I. 620)
Erie Yellow KM (C.I. 411)
Erie Yellow Y (C.I. 365)
Fastolite Lemon Yellow GL
Fastolite Yellow 3GL
Fastusol Red 4BA (C.I. 278)
National Erie Yellow S5GP Conc.
Niagara Sky Blue 6B (C.I. 518)
Oxamine Brilliant Red BA–CF (Pr. 393)
Paranol Fast Green GBL
Pontamine Diazo Orange G Conc. 200%
Pontamine Fast Green GBL
Pontamine Fast Red 8BLX (C.I. 278)
Pontamine Sky Blue 6BX Greenish Conc. 150% (C.I. 518)
Pontamine Yellow SX (C.I. 622)
Solantine Blue Green FWL
Solantine Red 8BL (C.I. 278)
Solantine Yellow FF (C.I. 814)
Solantine Yellow 4GL (Pr. 53)
Solophenyl Blue 10GL 200%
Solophenyl Fast Blue Green BL 200% (Pr. 470)
Stilbene Yellow 3GA (C.I. 622)

For the production of black-and-white light-polarizing prints, the iodine solutions mentioned above are to be preferred for the reason that the stain obtained has a higher dichroic ratio, in general, than the direct cotton dyes. The relief is removed from the iodine solution and pressed with its face or relief side in contact with the oriented surface of a suitable plastic such as polyvinyl alcohol. The two elements are pressed together in contact with each other, as will hereinafter be described.

The method steps referred to above have been disclosed in the above mentioned Letters Patent to Land, to which reference may be had for a more complete and detailed disclosure.

The present invention contemplates continuously reproducing superimposed images on opposite sides of a light-transmitting plastic film which may be either transparent or translucent, and to this end there has been provided an apparatus which is effective continuously and simultaneously to reproduce superimposed successive prints on opposite surfaces of a suitable film.

The machine is schematically shown in the drawing and comprises a plurality of tanks containing suitable fluids for processing washoff relief strips and for conditioning the film for receiving on opposite surfaces thereof superimposed images from the washoff relief strips. The image-receiving film 12 is wound on a stock roll 10 and is in the form of a continuous length of suitably oriented polyvinyl alcohol film which is fed to a tank 14 containing a solution of 1% sodium carbonate monohydrate and 1% sodium hydroxide. This solution is maintained at a temperature of substantially 70° F., and the pre-wetting tank 14 is provided with sufficient solution so that the film will remain in the solution for a period of about two minutes. As shown, the film 12 passes under a guide roll 16 and then upwardly out of the solution. The film 12 then passes over a guide roller 18 to a toothed wheel 20 having teeth 22 thereon arranged to be received in suitable perforations on each side of the film 12. The wheel 20 is provided with a friction drag 23 which is arranged to apply a predetermined amount of tension to the film strip 12.

The machine is provided also with a pair of stock rolls 24 and 26, on which suitable washoff relief strips 28 and 30 are respectively wound. One of these relief strips, for example, the relief strip 28, is mounted on stock roll 24 and is prepared from one of a pair of stereoscopic negatives in the usual manner. The other strip 30 on the stock roll 26, however, is reversed from right to left with respect to the other. This may be conveniently accomplished during the exposure steps described above by positioning one negative during the exposure step with its emulsion side facing the base side of the relief film, and the other negative during the corresponding exposure step with its base side facing the base side of the relief film. As a result, one relief will be substantially a mirror reproduction of the other, with the exception that the images thereon are relatively offset by reason of their stereoscopic relation. Or, preferably the negatives can be exposed originally in such a way that the image received by one is reversed left-to-right from that received by the other.

The strips 28 and 30, having thereon successions of washoff reliefs representing right and left stereoscopic images, are fed into and out of a tank 32 containing water heated to a temperature of approximately 120° F. The tank 32 is provided with a pair of guide rolls 34, 36, under which the strips 28, 30 respectively pass. The strips 28, 30 then pass upwardly out of the water bath and over guide rolls 38, 40 respectively. The tank 32 is of sufficient size so that the strips 28, 30 are immersed in the water bath approximately three minutes, a period of time sufficient to condition the washoff reliefs on the strips for subsequent imbibition of a dye solution.

After the strips 28, 30 have left the guide rolls 38, 40, they pass downwardly into a tank 42 having therein a dye bath comprising, for example, a solution containing 5% acetic acid and 0.2% to 1% dye. The strips 28, 30 pass down through the dye solution and under guide rolls 44, 46 respectively. The strips then pass upwardly and over guide rolls 48, 50 respectively. The dye bath or solution in the tank 42 is maintained at a temperature of approximately 105° F., and is of sufficient depth to permit the strips to be immersed therein for approximately three minutes, which is sufficient under normal conditions to permit the washoff relief strips 28, 30 to take up an adequate quantity of dye. The dyed washoff relief strips 28, 30 then pass downwardly into a tank 52, having therein a rinsing solution, and pass under guide rolls 54 and 56, respectively. Strips 28 and 30 then pass upwardly and out of the solution over guide rolls 58, 60. The solution in the tank 52 is maintained at a temperature of approximately 70° F. and is of sufficient depth so that the strips are immersed in the rinsing solution about 30 seconds, a time sufficient to remove surplus dye solution from the surface thereof.

The strip 28, as hereinbefore stated, passes from the tank 52 and forwardly over an idler roll 58 and downwardly under an idler roll 62 mounted in a tank 64. The tank 64 contains water and the strip 28 as it passes therethrough absorbs sufficient water to replace the liquid lost due to evaporation in its passage between the tank 52 and the tank 64.

The machine and process so far described relate to the conditioning of the polyvinyl film for receiving dye from the washoff reliefs and for conditioning and wetting or saturating the washoff reliefs with a suitable dye solution. The machine, however, is also provided with means for bringing the washoff relief strips 28, 30 into contact with opposite faces of the continuous film strip 12, and maintaining said three strips in pressure contacts for a period of time (about 4 minutes) which is sufficient to transfer completely the dye solution in the washoff reliefs to the respective contacting faces of the film strip 12.

In order to insure that the washoff relief strips 28, 30 will be brought into proper register with the film 12 and that the three strips will be maintained in register without the relative movement therebetween, the strips 28, 30 pass from the guide rolls 66, 60 respectively to drums 67, 68 having thereon spaced sprocket teeth 72, 70 arranged to enter the perforations adjacent to the edge portions of the washoff relief strips 28, 30.

Each of the rolls or drums 67, 68 is provided with a suitable friction drag 74, 76 which will respectively apply proper drag or tension to the strips 28, 30. As previously stated, the image-receiving film 12 also passes under a roll 20 having suitable spaced sprocket teeth 22 thereon which enter into the perforations in the film strip 12.

It is necessary, as suggested above, to combine the three strips in proper register, making certain that the washoff reliefs representing the images of a stereoscopic pair are superimposed one over the other on opposite faces of the film strip 12. To this end, the three film strips are combined and carried on an endless belt 78 having thereon a plurality of spaced pins 80 which extend sufficiently above the outer face of the endless belt 78 to receive the sprocket holes of the strips 12, 28 and 30. After the strips 28 and 30 have been registered so that the washoff reliefs representing images of a stereoscopic pair are superimposed on opposite faces of the film strip 12, a pivotally mounted seating device 82 is moved downwardly into contact with the upper film strip 28 and assures bringing the three film strips into pressure contact. As the belt 78 moves toward the right, successive pins will enter successive perforations in the film strips, thus maintaining successive stereoscopic pairs of images represented by the washoff reliefs in register.

The seating device 82 is pivotally mounted and is arranged to be released and swung out of operative position to permit perforations in the leading end of a suitable leader to be threaded on the pins 80. The seating device comprises a spring-loaded plate 83 urged toward the belt 78 by a spring device 87. The plate 83 has a pair of parallel grooves therein of sufficient depth and width to permit passage of the pins 80 on the belt 78. The plate 83 is so arranged relative to the belt 78 that the film strips 12, 28, 30 are engaged by the portions of the plate 83 adjacent to the grooves to force the strips progressively downwardly on the pins 80 as the strips advance with the belt 78 until the lowermost strip 30 is pressed against the belt 78. The device 82 is also provided with a spring-loaded squeeze roll 89 which is forced toward and against the top strip 28 by a spring device 91, and is effective to squeeze surplus liquid from between the strips and also to bring the strips 28, 30 into pressure contact with the image-receiving film 12 to insure transfer of the dye solution from each of the washoff reliefs on said strips to the surface on the strip 12 with which they are in contact.

As the three combined strips pass from under the squeeze roll 89, they pass under an endless belt 84 which is maintained in pressure contact with the endless belt 78 over a substantial distance in order to maintain the strips in pressure contact for about 4 minutes or until the dye solution in each of the washoff reliefs is transferred to the respective contacting face of the receiving film strip 12. The distance of contact of the belt 78 with the film strip 30 may vary. It is only necessary that the speed of the belt 78 is sufficient to maintain the three contacting film strips in pressure contact until dye solution transfer from the washoff reliefs is completed.

The belt 78 is power driven from a suitable electric motor 86 through a reduction gear 88. The rate of speed of the belt 78 can be varied as pointed out above, depending upon the length of contact between the belt 84 and the three superimposed film stops. If the distance is in the order of 2 feet, for example, the speed of the belt 78 may be of the order of 6″ to 8″ per minute, but on the other hand, if the distance is increased to say 100 feet, the speed of travel of the belt 78 could be increased to substantially 300″ or 25 feet per minute.

In order to facilitate transfer of the dye from the washoff reliefs to the receiving strip, the belt 78 is in contact with the upper surface of a heating element 90 which may be in the form of a closed container in which water or other suitable liquid is maintained at a suitable temperature, preferably in the range of 104° to 113° F. It is evident, however, that other suitable heating means could be employed if so desired. The belt 78, as shown in the drawing, rides on the top surface of the heating device 90, and is held taut thereagainst. To this end, the belt 78 is provided with adjusting means 92 which may be utilized as necessary to apply the desired tension to the belt 78. The belt 84 is maintained in pressure contact with the upper film strip 28 through conventional spring-loaded tensioning devices shown at 94 and 96. Preferably the support for the belt 84 is pivotally mounted to permit the belt 84 to be unlocked and swung out of clamping position to permit loading at the beginning of the cycle of operation.

Mention has previously been made of friction drags 23, 74 and 76. These drags or brakes are effective to apply uniform tension to each of the films strips 12, 28, 30, thus insuring that the pins 80 on the belt 78 will enter perforations formed along the side edge portions of each of the film strips. Preferably the pins 80 are so shaped that they fit the perforations closely, thus further insuring that there will be no relative movement between the film strips after they are brought into pressure contact. After the strips pass beyond the belts 78 and 84, the strips 12, 28, 30 are separated and respectively wound on receiving rolls 102, 104 and 106. The separated strips may be further dried, if necessary, and the strips between the ends of the belts 78 and 84 and the receiving rolls may be enclosed in suitable ducts which are supplied with heated air.

When the foregoing steps are completed, the three elements are separated as described just above. If only a black-and-white or a monochromatic print is desired, the print may then be considered as finished. On the other hand, if a full-color stereoscopic motion picture film is desired, the transfer or imbibition printing operations are repeated until three color images are transferred to each surface of the receiving film strip 12.

As was pointed out above, direct cotton dyes may be used in the production of light-polarizing black-and-white prints, monochromatic color prints, or full-color prints, depending upon the proper choice of the particular dyes used. Black-and-white prints of excellent quality may be obtained by following the above procedure, and using for example a dye solution containing .6% of Niagara Sky Blue 6B, and .2% each of Solantine Red 8BL and Solantine Yellow FF. It is to be understood that any other such combination of dyes is to be construed as within the scope of the invention and of the claims herein.

Substantially the same process as that outlined above may be followed for the production of three-color prints. The difference in this case is that separate washoff reliefs must be prepared for each of the three color components—cyan, yellow and magenta. Such reliefs may be obtained in conventional photographic manner by first preparing three black-and-white separation negatives from a color transparency, such, for example, as a "Kodachrome" transparency, by using for each negative a filter which will transmit only the desired component; red, green and blue-violet. From the negative so formed, separate washoff reliefs may be prepared as outlined above, and each may then be used in combination with dichroic dyes of suitable color, such, for example, as those mentioned below, to produce a corresponding three-color dichroic print. It is evident that the images will be transferred or printed on the opposite molecularly oriented surfaces of the hydrophilic plastic receiving film 12, successively. For example, the yellow images may first be transferred to the receiving film, and then the magenta and then the cyan successively, thus providing a full-color stereoscopic film comprising superimposed right- and left-eye images, which may be separated by the use of suitable analyzers.

Among the direct cotton dyes found especially suitable for the production of three-color stereoscopic prints may be mentioned Fastolite Yellow 3GL, Chlorantine Fast Red 5B, and Solophenyl Fast Green BL 200%. Ten grams of the Fastolite Yellow GL, for example, are dissolved in 750 cc. of distilled water, to which 250 cc. of 20% acetic acid are added. Five grams of Chlorantine Fast Red 5B are dissolved in 750 cc. of water, to which 250 cc. of 20% acetic acid are added. Two grams of Solophenyl Fast Blue Green BL 200% are dissolved in 950 cc. of water, to which 50 cc. of 20% acetic acid are added. These dye solutions form suitable dichroic stains and, in the concentrations and at the speeds noted in the description of the machine, form three-color images of suitable density.

As has been previously stated, the foregoing description is illustrative only of one operative embodiment of the present invention. It is to be remembered, however, that each step therein is a variable, and that none of the ingredients, times, or proportions for any step is critical except insofar as they may be made so by other variables. The specific examples given comprise operative embodiments of the invention by the use of which excellent results have been obtained. However, considerable variation is possible in virtually any degree thereof, and one or more solutions or steps can be compensated for in the other steps. It is accordingly obvious that no precise or set rules can be given, and that it would be difficult, if not impossible, to set even outside limits on the ranges of the variation.

The apparatus illustrated and described herein is designed to bring a pair of washoff relief strips into contact with opposite faces of a receiving film strip substantially simultaneously. It is evident, however, that the washoff relief strips need not be brought simultaneously into contact with opposite faces of the receiving film strip. That is to say, one washoff relief film strip may be brought into contact with one surface of a receiving film strip and subsequently the other washoff relief film strip may be brought into contact with the other surface of the receiving film strip. Obviously, however, the time interval is relatively small as compared to the total time that the washoff relief strips are in close contact with the receiving film strip to cause complete dye transfer from the washoff reliefs onto the receiving film strip. Pressure is preferably applied to the three superimposed strips to press the strips together to cause dye transfer in the washoff relief strips and the opposite surfaces of the receiving film strip. Alternately the various strips will be brought into close contact with the aid of pressure plates or backing strips, it being important only that the strips be brought into sufficiently close contact to exclude excessive liquid from between the contacting surfaces to permit substantially complete dye transfer to take place.

It should also be pointed out that although the foregoing description emphasizes printing with reliefs prepared from photographic negatives, the invention is in no way limited to the use of such materials. Reliefs may be prepared by exposure through any desired differentially light-absorbing medium, such for example as a blueprint, or in any other convenient way. It should be further pointed out that the invention is not limited to the preparation of superimposed stereoscopic images, but may be practiced equally well in connection with two-dimensional images in full color.

It is to be understood that the invention is not limited to the use of colloid reliefs or other photosensitive gelatin reliefs described above. Inasmuch as the preferred dyes for use in the practice of the invention may be used in a water solution, the reliefs will of course preferably be made from hydrophilic material. In general, suitable reliefs may be prepared from any material which will adsorb absorb the desired dye solution and then transfer it to the oriented plastic sheet on which the light-polarizing or other image is to appear.

The term "transparent" as used herein is intended to include any light-transmitting material which may be either transparent or translucent.

Since certain changes may be made in the above process and apparatus without departing from the scope of the invention herein involved, it is intended that all matter contained in the above description or shown in the accompanying drawing shall be interpreted as illustrative and not in a limiting sense.

What is claimed is:

1. An imbibition printing method of making a continuous film strip carrying properly registered images on its opposite surfaces, comprising the steps of continuously advancing a strip of a material for carrying said images in a given direction and at a given speed through a preconditioning bath to a central location between a pair of printing matrices also in the form of strips and each containing a plurality of image frames, continuously advancing a first of said pair of printing matrices through preconditioning, printing dye and rinsing baths to superimposition with one side of the central image-carrying strip, continuously advancing the second of said pair of printing matrices through substantially similar baths and then a greater distance than that travelled by said first printing matrix through an additional wetting bath to superimposition with the opposite side of said image-carrying strip, carrying the strips in correct superimposed assembled relation across a fixed supporting surface having a length equivalent to a plurality of said image frames, applying a compressive force to the uppermost of said strips substantially throughout its travel across said supporting surface while the undermost of said strips is held against yielding movement by said supporting surface to provide an imagewise transfer of said printing dye from the image frames of the respective matrix strips to opposite surfaces of the central strip and the formation of dye images on the latter, and separating said matrix strips from contact with said central strip after completing the formation of said dye images.

2. An apparatus for printing from a pair of multi-image matrix strips, having sprocket holes along at least one longitudinal margin of each, a plurality of images on opposite surfaces of a centrally positioned continuous film strip having sprocket holes along at least one of its longitudinal margins, comprising supply and takeup spool means for said strips, tank and guide roller means for wetting said film strip and for applying, in order, a preconditioning liquid, a printing dye and a rinsing liquid to both of said matrix strips and an additional wetting liquid to but one matrix strip, sprocket wheel means having friction brakes for accepting and positioning said strips to obtain correct alignment of the images of said matrix strips, means providing a heated fixed supporting surface, a heat-conditioning endless belt slidably mounted on said supporting surface and having sprocket-type teeth extending along at least one of its longitudinal edges for engaging the sprocket holes of said strips, a drive motor for moving said belt across said supporting surface at a given speed, a pivotal spring-loaded pressure-applying plate overlying said endless belt adjacent one end of said supporting surface for initially bringing together said strips in superimpised relation on said belt so that they are carried together in assembled relation by said belt, a second endless belt coextensive with a major area of said first-named endless belt and overlying said supporting surface exclusive of the portion underlying said pressure plate, for compressing said strips evenly throughout said major area, and tensioning means for varying the tautness of said second endless belt and, accordingly, the compression of the assembly of said strips which is positioned between said endless belts during the carriage of said strips across said heated supporting surface.

3. An apparatus for printing images on opposite surfaces of a continuous film strip, as defined in claim 2, wherein said pressure-applying plate includes a spring-loaded compression roller adjacent one end for squeezing out any excessive amounts of liquid which may exist between the assembled strips.

4. An apparatus for printing from a pair of matrix strips, each including a plurality of images and impregnated with a printing dye, a plurality of properly registered images on opposite surfaces of a continuous film strip, comprising drive means for advancing said film strip in a given direction and at a given speed to an assemblage location between said matrix strips, the latter strips likewise being advanced by said drive means, tank and guide roller means for wetting said film strip with a preconditioning liquid prior to its arrival at said assemblage location, tank and guide roller means for applying, in order, a preconditioning liquid, a printing dye and a rinsing liquid to image areas of said matrix strips prior to their advancement to said assemblage location, additional tank and guide roller means located in the path of one of said matrix strips which undergoes a greater travel distance than the other, said additional tank containing a wetting liquid and being located between said tank means for applying a rinsing liquid and said assemblage location, a pivotal spring-loaded pressure-applying plate for compressing said strips into assembled relation at said location, said film strip being positioned between the printing surfaces of the two matrix strips, means providing a fixed supporting surface, an endless belt in slidable contact with said supporting surface adjacent said assemblage location for carrying said assembled strips across said surface, a second endless belt in compressive contact with the upper surface of said strips during their carriage on said first-named endless belt providing, respectively, compression of the assembled strips, an imagewise transfer of said printing dye from the respective matrix strips to opposite surfaces of the centrally located film strip, and the formation of dye images on said surfaces, and divergingly positioned takeup means for separating said matrix strips from said central film strip after formation of the dye images on the latter.

References Cited in the file of this patent

UNITED STATES PATENTS

| | | |
|---|---|---|
| 1,560,438 | Taylor | Nov. 3, 1925 |
| 1,596,641 | Weaver et al. | Aug. 17, 1926 |
| 1,707,710 | Comstock | Apr. 2, 1929 |
| 1,834,355 | Thornton | Dec. 1, 1931 |
| 1,879,775 | Thornton | Sept. 27, 1932 |
| 2,289,714 | Land | July 14, 1942 |
| 2,315,373 | Land | Mar. 30, 1943 |
| 2,328,492 | Rackett | Aug. 31, 1943 |
| 2,346,774 | Mahler | Apr. 18, 1944 |
| 2,369,176 | Rackett | Feb. 13, 1945 |
| 2,417,060 | Capstaff | Mar. 11, 1947 |
| 2,495,821 | Pohl | Jan. 31, 1950 |
| 2,544,258 | Rackett | Mar. 6, 1951 |
| 2,602,387 | Pohl | July 8, 1952 |
| 2,648,280 | Pohl | Aug. 11, 1953 |